United States Patent
Castoe

[11] 3,875,672
[45] Apr. 8, 1975

[54] WHEEL ALIGNMENT RACK WITH ADJUSTABLE TURNTABLES

[76] Inventor: John J. Castoe, 10234 McVine St., Sunland, Calif. 91040

[22] Filed: May 24, 1973

[21] Appl. No.: 363,384

[52] U.S. Cl. .............................. 33/203.12; 104/44
[51] Int. Cl. .............................................. G01b 5/28
[58] Field of Search ......... 104/44; 108/20; 248/349; 33/203, 203.12, 203.13

[56] References Cited
UNITED STATES PATENTS

| | | | |
|---|---|---|---|
| 2,720,036 | 10/1955 | Berger | 33/203.12 |
| 2,736,104 | 2/1956 | Sherman | 33/203.12 |
| 3,181,248 | 5/1965 | Manlove | 33/203.12 X |
| 3,187,440 | 6/1965 | Merrill et al. | 33/203.13 |
| 3,465,580 | 9/1969 | Cady et al. | 33/203.13 X |

Primary Examiner—William D. Martin, Jr.
Attorney, Agent, or Firm—Christie, Parker & Hale

[57] ABSTRACT

A wheel alignment rack for automobiles includes a pair of turntables on which the wheels of an automobile are mounted, and a remote-controlled turntable-rotating system which includes an air cylinder having a reciprocating piston arm engaged with one of the turntables at a point spaced from the turntable axis of rotation. Forward and reverse control valves mounted adjacent to each turntable are linked to the air cylinder. The control valves can be actuated to move the piston arm in either a forward or reverse direction to rotate the turntables in unison in either a clockwise or counterclockwise direction steer the wheels to a selected angular orientation in preparation for measuring and adjusting the alignment of the wheels.

10 Claims, 8 Drawing Figures

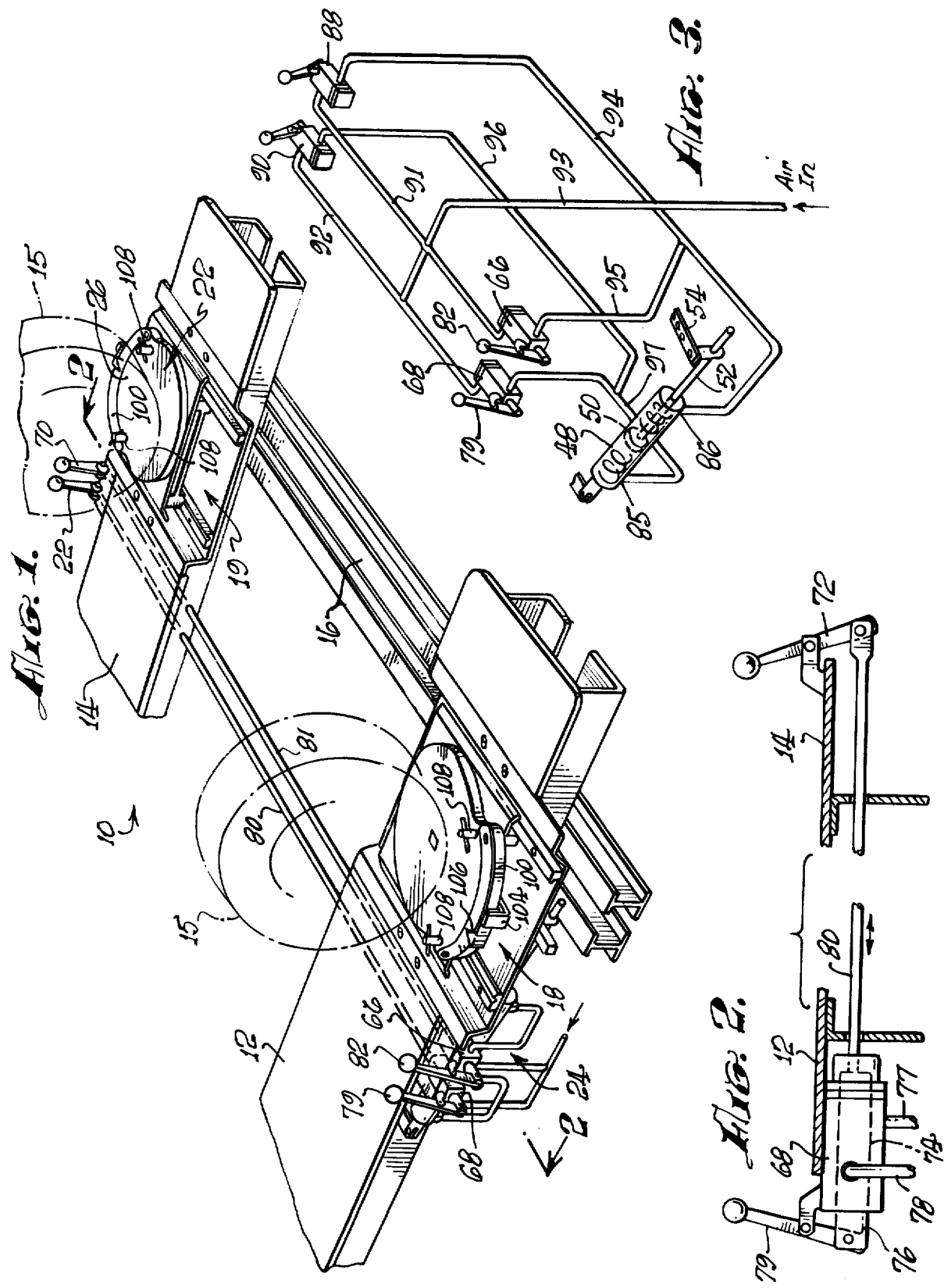

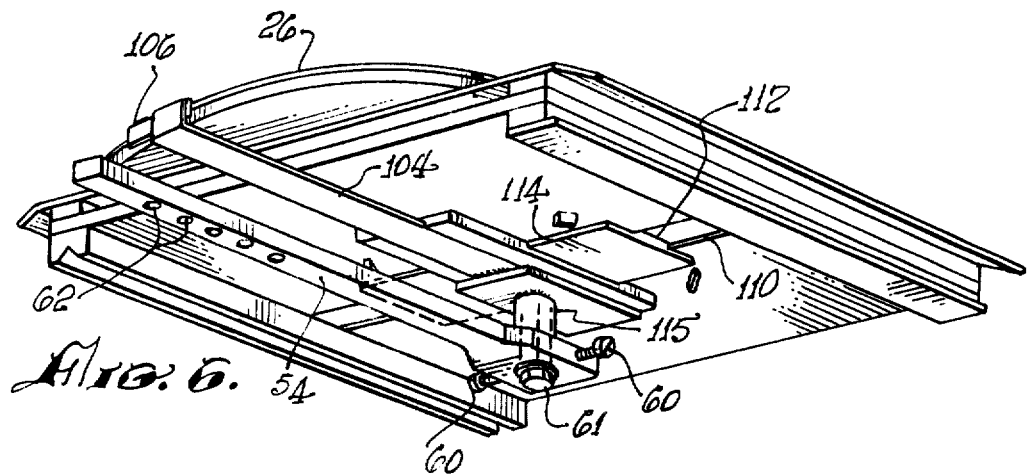
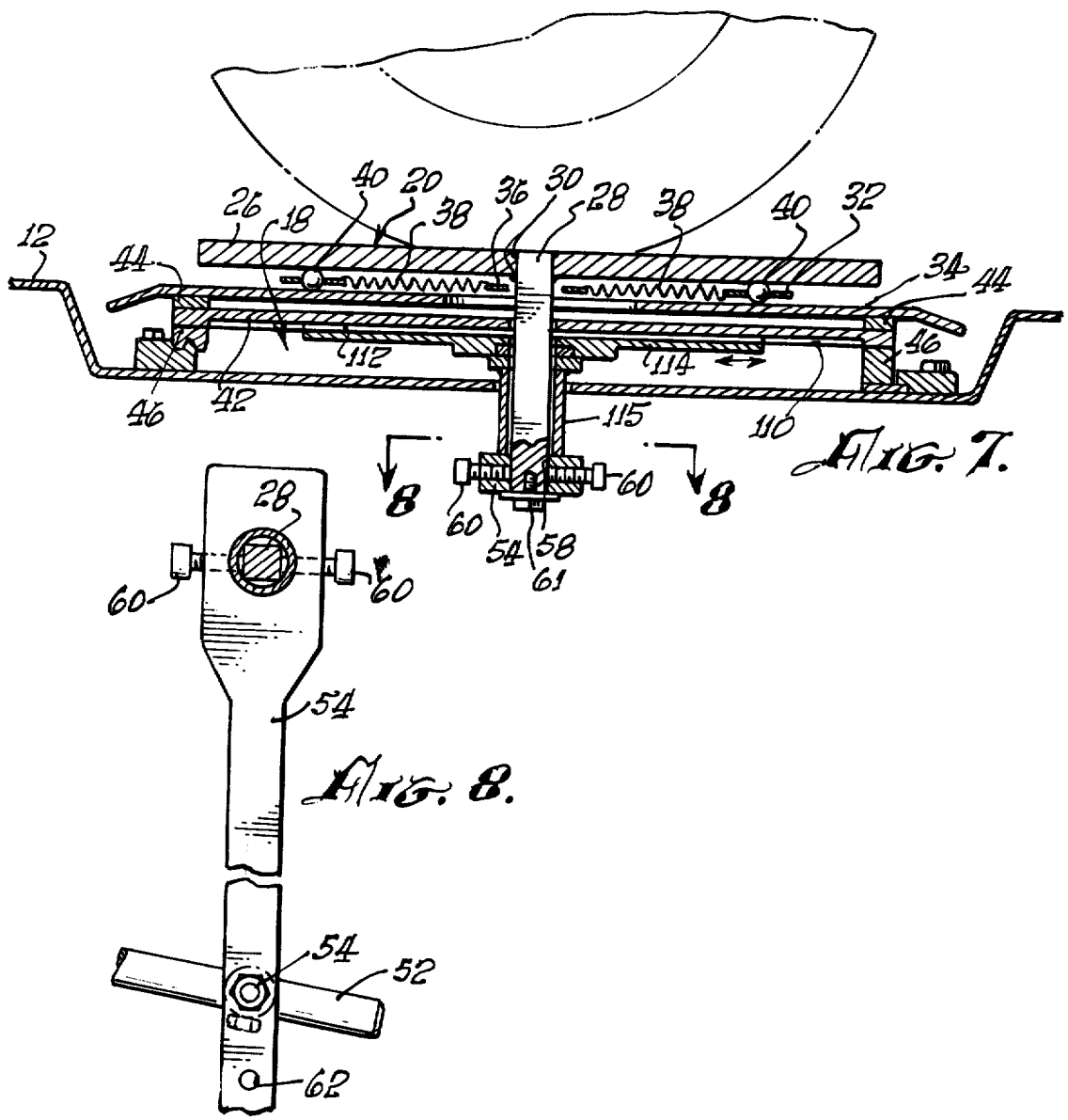

WHEEL ALIGNMENT RACK WITH ADJUSTABLE TURNTABLES

BACKGROUND OF THE INVENTION

This invention relates to an improved wheel alignment rack for automobiles.

The front suspension system of an automobile supports the front wheel hub assemblies in a predisposed position with respect to the vehicle frame. The alignment of the vehicle's wheels is periodically adjusted by setting the toe-in (angular orientation of the wheel relative to the vertical plane), and caster (angular offset of the wheel axle) angles of the wheels to meet certain preselected measurements.

The front wheels of an automobile generally are aligned by putting the automobile on a rack having a pair of turntables at one end. The front wheels rest on the turntables which allow the wheels to be steered clockwise or counterclockwise through a given angle in preparation for measuring the toe-in and caster angles of each wheel. By way of example, the caster angle for each wheel may be measured after the wheels are steered to a preselected angle relative to their straightahead (neutral) position, (by rotating the turntables clockwise, for example) and held in the preselected angular orientation while a gauge or the like is used to measure the existing caster angle of each wheel. The toe-in is measured after the wheels are steered through a different angle relative to neutral.

Several different types of measuring devices, including angle-measuring gauges, are used by auto mechanics to measure caster and toe-in for various automobiles. A common type of guage is mounted on the wheel hub. The wheel is then steered to a specified angular orientation relative to its neutral position, and while the wheel is held at that angle, the gauge provides a reading of the vehicle's actual toe-in or caster measurement. If the toe-in or caster angle does not equal the required angle, the proper mechanical adjustment is made to the automobile suspension system, and the gauge is then reconsulted, while holding the wheel in its preselected angular orientation, to obtain the new toe-in or caster reading.

For many years, automobile mechanics have aligned wheels by setting the front wheels on the turntables, and then grasping a front wheel and physically moving it through its preselected angle. The mechanic then holds the wheel steady at its required angle, while the toe-in or caster measurement is read from the gauge. If the wheel's toe-in or caster angle needs adjustment, the adjustment is made, and the wheel is physically turned and held again after the adjustment is made while the gauge is reconsulted.

The job of physically turning each wheel and holding it in place can become tiring to the workman, especially if he aligns the wheels of several automobiles per day, and if several adjustments have to be made for the toe-in and caster of each wheel. Moreover, the job of physically turning the wheels is especially difficult in automobiles with power steering, and when using certain types of gauges which prevent the mechanic from easily reaching the wheel, requiring him to stand in an awkward position each time the wheel is turned.

A recent development aimed at easing the work required to turn the wheels when aligning them comprises a remotecontrolled wheel turning device which is releasably attached to the steering wheel of the automobile. When the mechanic actuates a remote control connected to the turning device, the steering wheel is automatically turned to steer the wheels to the desired angle. Thus, the mechanic avoids the effort required in physically turning the wheels. However, the steering wheel turning device has several disadvantages, including a relatively high cost, the inability to fit all makes of automobiles, the inability to steer the wheels through certain relatively large angles, and the inability to turn the wheel immediately to its desired angle because of the slack inherent in the automobile steering system.

SUMMARY OF THE INVENTION

This invention provides an improved wheel alignment rack which allows an automobile mechanic to automatically steer the wheels of an automobile through a desired angle without the need for physically moving the wheels. Thus, the job of aligning the wheels of an automobile is made substantially less tiring physically. The improved wheel alignment rack of this invention also has several advantages over the prior art automatic steering wheel turner. It is substantially less expensive, it functions independently of the make of the automobile or the particular design of the automobile steering wheel, it has a faster response time in turning the wheels to the correct angle, and it is substantially easier to use than the prior art steering wheel turner.

Briefly, the improved wheel alignment rack includes a pair of laterally spaced apart support members extending in a parallel relation to form a rack for supporting the wheels of an automobile. A separate turntable on each support member rotates about an axis, with the two turntables being positioned so they will provide rotational support for the front wheels of the automobile. At least one of the turntables is automatically rotated about its axis by remote-controlled turntable-rotating means which include power means movable in a forward and reverse direction, and means engaged with the turntable and operative in response to movement of the power means to rotate the turntable about its axis in either a forward direction or a reverse direction to turn the wheels of the vehicle to a selected orientation in preparation for measuring and adjusting the alignment of the wheels.

In a preferred form of the invention, the power means includes an elongated actuating arm rigidly engaged with the turntable and operative to reciprocate in a path spaced from the axis of rotation of the turntable. Preferably, the actuating arm includes a piston slidably disposed in a cylinder and molvable in a forward direction and a reverse direction. The power operated piston arm is operated by forward and reverse actuating means adjacent each turntable and coupled with the cylinder for moving the piston arm in a forward and reverse direction.

Thus, the mechanic can steer the wheels of the automobile through any desired angle in either a clockwise or counterclockwise direction by operating the remote-controlled turntable-rotating means.

These and other aspects of the invention will be more fully understood by referring to the following detailed description and the accompanying drawings.

BRIEF DESCRIPTION OF THE DRAWINGS

FIG. 1 is a fragmentary perspective view showing an improved wheel alignment rack and remote-controlled turntable-rotating system according to this invention;

FIG. 2 is a fragmentary elevation view, partly in section, taken on line 2—2 of FIG. 1 and control valves mounted on opposite sides of the rack for use in operating the turntables of the rack shown in FIG. 1;

FIG. 3 is a prespective view illustrating an alternate pneumatic control system of the wheel alignment rack;

FIG. 6 is a fragmentary perspective view showing the underside of the turntable shown in FIG. 4;

FIG. 7 is a fragmentary cross-sectional elevation view, partly broken away, taken on line 7—7 of FIG. 4; and FIG. 8 is a fragmentary elevation view, partly in section, taken on line 8—8 of FIG. 7.

DETAILED DESCRIPTION OF THE PREFERRED EMBODIMENTS

Figure 4:
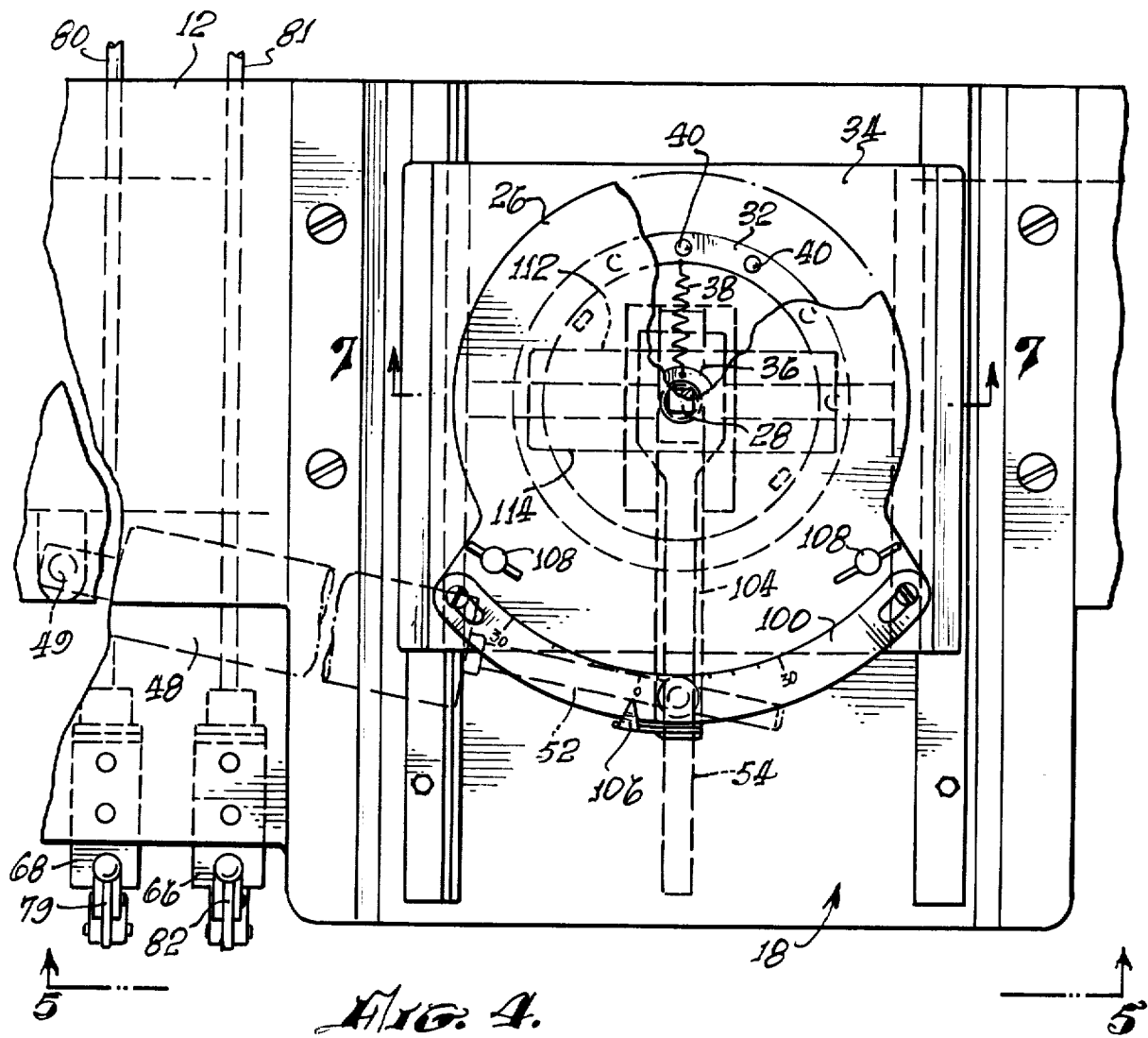
FIG. 4 is a fragmentary plan view, partly broken away, showing the detailed construction of the driven turntable of the wheel alignment rack.

Referring to FIG. 1, an improved wheel alignment rack 10 includes a pair of laterally spaced apart, parallel support members 12 and 14 onto which the wheels 15 of an automobile are driven to support the automobile when aligning the wheels. Support members 12, 14 are held in a fixed parallel position above the floor by a pair of laterally extending I-beams 16 rigidly secured to the underside of the support members. The I-beams are held above the floor by appropriate support means (not shown).

Separate recessed areas 18 and 19 are located near the end of support members 12 and 14, respectively. Separate turntables 20 and 22 are mounted in recessed areas 18 and 19, respectively. The turntables rotate about respective vertical axes, and rotatably support wheels 15 when the wheels are in the process of being aligned. Turntable 20 is linked to a rotation arm drive mechanism 24 and turntable 22 is not linked to drive mechanism 24. Otherwise, the two turntables are identical in construction. In use, turntable 20 will function as the main drive turntable, while turntable 22 will be the idler turntable. The construction of turntable 20 only will be described below, and the description for turntable 20 will suffice for turntable 22.

Referring to FIGS. 4 through 7, turntable 20 includes a rotatable upper wheel support plate 26 keyed to the top of a vertically extending and downwardly depending, transversely square, rotatable shaft 28. Wheel support plate 26 preferably is rigidly secured to the top of shaft 28 by welds 30 so that rotation of the shaft about its axis will rotate the wheel support plate about the axis through the shaft. Shaft 28 is square-shaped in cross-section so the wheel support plate will be keyed to the shaft and so that rotation of the shaft will effectively rotate the turntable under the heavy load imposed by the weight of the automobile.

A ring-shaped bearing plate 32 is sandwiched between wheel support plate 26 and a horizontally disposed fixed base plate 34. The bearing plate includes an inner ring 36 having a square-shaped central opening fitted around shaft 28, and four equidistantly spaced apart, radially extending coil springs 38 extending from inner ring 36 to bearing plate 32. A series of circumferentially spaced apart ball-bearings 40 are carried by the bearing plate to rotatably support the bottom of wheel support plate 26 so the latter can rotate about its axis relative to fixed base plate 34. The ball-bearings also movably support plate 26 for lateral and longitudinal movement relative to the base plate, as will be described in greater detail below.

The base plate 34 is rigidly mounted above the recessed portion of the support member 12 by a support assembly which includes a horizontally disposed second base plate 42 spaced below base plate 34, and a pair of laterally spaced apart, parallel support bars 44 rigidly secured between both base plates on opposite sides of vertical shaft 28. A second pair of laterally spaced apart, parallel support bars 46 are rigidly secured to the underside of second base plate 42 to support both base plates above the recessed portion of support member 12.

As shown best in FIGS. 4 and 5, turntable drive mechanism 24 includes a horizontally disposed, elongated air cylinder 48 mounted below wheel support member 12 adjacent recessed area 18. The cylinder is held in place by a bracket and hinge pin assembly 49. A horizontally slidable piston 50 in cylinder 48 has a reciprocating piston rod 52 extending from the cylinder to the point beneath recess 18. Piston rod 52 reciprocates longitudinally along a horizontal axis spaced laterally from the vertical axis through shaft 28. As shown best in FIGS. 4 through 8, an elongated laterally extending lever arm 54 links piston rod 52 to shaft 28. A bolt 56 rigidly connects lever arm 54 to piston rod 52 at a point spaced laterally from the axis of shaft 28. The bottom of shaft 28 fits into a rounded opening 58 in the end of lever arm 54, and a pair of bolts 60 threaded into the opposite sides of lever arm 54 rigidly fasten the lever arm to the bottom of shaft 28. A bolt 61 threaded into the bottom of shaft 28 also holds the lever arm in place around the bottom of the shaft.

In use, longitudinal reciprocation of piston rod 52 moves lever arm 54 through an arc to rotate shaft 28 about its axis which, in turn, rotates wheel support plate 26 through an arc proportional to the distance through which piston rod 52 is extended. A series of longitudinally spaced apart threaded holes 62 in the free end of lever arm 54 provides means for adjusting the point of connection between piston rod 52 and the lever arm to adjust the torque with which the turntable is rotated. This adjustment can be made in accordance with the weight of the automobile so that increased torque can be applied to the turntable for heavier automobiles.

Referring to FIG. 1, the reciprocating movement of piston rod 52 is remotely controlled by a pneumatic control system with mechanical cross-linking, the system including a pair of three-way air valves 66 and 68 mounted adjacent turntable 20. A pair of remote mechanical actuators 70 and 72 are mounted adjacent turntable 22 and are linked to air valves 66 and 68, respectively, in a manner described in detail below. Air valves 66 and 68 are identical in construction, and the construction of each valve will be understood best with reference to FIG. 2, which shows the detailed construction of valve 68. The valve includes a cylinder 74 having a slidable piston 76 which controls the flow of air from an air inlet line 77 to an air exhaust line 78. An upwardly extending lever arm 79 is connected to piston 76. The lever arm is hinged to pivot back and forth and thereby alternately block or allow the flow of air from air inlet line 77 through the cylinder and out through air exhaust line 79.

Mechanical actuator 72 is linked to piston 76 by a laterally extending elongated rod 80 which is hinged to the bottom of actuator 72. Similarly, mechanical actuator 70 is linked to the piston in control valve 66 by a rod 81. As shown best in FIG. 5, valve 66 also includes a lever arm 82 for controlling the flow of air from an air inlet line 83 through an air exhaust line 84. Air exhaust line 78 connects valve 68 with an inlet port 85 on the left side of piston 50 (with reference to FIG. 5), and exhaust line 84 connects valve 66 with an inlet port 86 on the right side of piston 50. Air inlet lines 77 and 83 are coupled to an air inlet hose 87 which delivers air under pressure from a compressor (not shown) to the inlet ports of valves 68 and 66, respectively.

Figure 5:
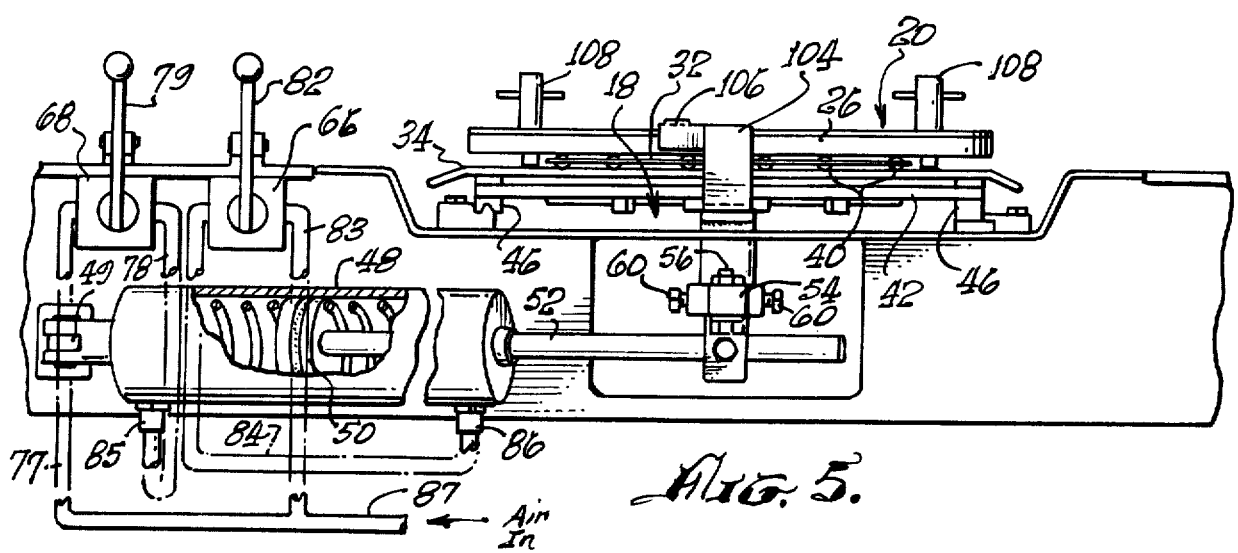
FIG. 5 is a fragmentary elevation view, partly in section and partly broken away, taken on line 5—5 of FIG. 4.

During use of the control system shown in FIGS. 1, 2, 4, and 5, lever arm 79 of valve 68 can be actuated to force air under pressure through exhaust line 78 into cylinder 48 to move piston 50 to the right in FIG. 5. Lever arm 82 can be actuated to move piston 50 to the left in FIG. 5. The mechanical cross-linking provided by rods 80 and 81 allows valve 68 to be remotely operated by actuating lever 72 to move piston 50 to the right in FIG. 5, and also allows valve 66 to be controlled by actuating lever 70 to move piston 50 to the left in FIG. 5.

FIG. 3 shows an alternate form of the turntable control system in which the mechanical cross-linking shown in FIG. 1 is replaced by pneumatic cross-linking which includes three-way air valves 88 and 90 (identical in construction to valves 66 and 68) in place of mechanical actuators 70 and 72, respectively. An elongated air inlet line 91 connects the inlet ports of valves 66 and 88, and a second air inlet line 92 connects the inlet ports of valves 68 and 90. An air supply hose 93 delivers air under pressure to inlet lines 91, 92 from an air compressor (not shown). The exhaust ports of valves 66 and 88 are interconnected by air exhaust lines 94 and 95, and the exhaust ports of valves 68 and 90 are interconnected by air exhaust lines 96 and 97.

Prior to using the improved wheel balancing rack of this invention, turntables 20 and 22 are held in a fixed position. A separate radial scale 100 is located on each turntable to measure the number of degrees through which the turntables are rotated. The turntables are initially turned to their neutral position (zero° reading on scale 100) prior to when the wheels of the automobile are set on them. An elongated rotation arm 104 is rigidly engaged with shaft 28 to rotate a pointer 106 above scale 100. The pointer indicates the angular position of the turntable. Thus, with reference to FIG. 4, when the turntable is rotated clockwise, pointer 106 moves to the left in FIG. 4, and conversely, when the turntable is rotated counterclockwise, the pointer moves to the right in FIG. 4, thereby indicating the angle through which the turntables, and the wheels of the automobile, are being turned. A pair of upright, rotatable locking pins 108 threaded into each turntable can be threaded down and frictionally engaged with base plate 34 to hold each turntable in its fixed neutral position as the wheels of the automobile are being positioned on the turntables. Prior to putting the wheels of the automobile on the turntables, the lateral spacing between the two turntables is adjusted in accordance with the distance between the vehicle's wheels. This adjustment is made by moving the turntables laterally inwardly or outwardly against the bias of springs 38 in ball-bearing plate 32. During such movement air cylinder 48 and lever arm 54 are able to swing in or out about the vertical axis through pivot pin 49. As shown best in FIGS. 6 and 7, second base plate 42 includes a guide way 110 for accommodating longitudinal movement of a shoulder 112 of a plate 114 as the turntable moves longitudinally. Plate 114 is rigidly engaged with shaft 28 via a sleeve 115 held in a rigid position around the shaft between the lever arm and the plate. Once the automobile wheels are in position on the turntables, locking pins 108 are loosened to allow the turntables to rotate freely relative to the wheel alignment rack.

In using the remote-controlled turntable-rotating system shown in FIG. 1, each three-way valve moves its corresponding piston to one of three positions: (1) air supply or operative position, (2) neutral position, or (3) exhaust position. If the mechanic is working on the wheel mounted on turntable 20, he can steer the wheel counterclockwise through a given angle by moving valve 68 to its operative position. This will supply air to inlet port 85 in cylinder 48 which will slide piston 50 to the right in FIG. 5 to move piston rod 52 to the right in FIG. 5 and thereby rotate turntable 20 in a counterclockwise direction. Valve 68 is held in its operative position, via lever arm 79, to continue moving the turntable counterclockwise until the desired angular orientation from neutral is reached. Lever arm 79 then can be moved to its neutral position to maintain the air in the lines and thereby hold the turntable in its fixed desired angular orientation. The turntable may be released from its selected angular position by moving lever arm 79 to the exhaust position which bleeds air from the line and allows the turntable to freely rotate again. If the mechanic working on the wheel on turntable 20 wants to steer the wheel clockwise through a given angle, he moves lever arm 82 of valve 66 to its operative position. This supplies air to inlet port 86 of cylinder 48, which will slide piston 50 to the left in FIG. 5 to move the piston rod to the left in FIG. 5 and thereby rotate turntable 20 in a clockwise direction. Rotation of turntable 20 automatically turns the steering system of the automobile to rotate turntable 22 in unison with turntable 20.

Once the mechanic has steered the wheel to the desired angle, he can then read an appropriate toe-in or caster measuring instrument mounted on the wheel hub to determine whether or not the vehicle suspension system needs adjustment. There is no need to physically move either of the wheels, and therefore the physical exertion required when aligning the wheels is substantially reduced when compared with the prior art methods of aligning wheels.

If the mechanic is working on the wheel mounted on turntable 22, for example, he can remotely steer the wheel clockwise through a given angle by moving actuating arm 70. This will automatically operate valve 66 to supply air to cylinder 48 to move piston 50 and piston 52 so they will rotate turntable 20 in a clockwise direction to automatically rotate turntable 22 clockwise also. The mechanic can monitor the scale on turntable 22 until the desired angular orientation is reached. He then moves actuating arm 70 to its neutral position to hold the wheel on turntable 22 in its desired angular orientation. The wheel on turntable 22 likewise can be steered in a counterclockwise direction by similar operation of actuating arm 72.

The toe-in and caster angle measuring gauges presently on the market tend to be different in the way they measure toe-in and caster. Some gauges require a given wheel to be steered clockwise through a given angle before the gauge is to be read, whereas other gauges require the wheel to be steered counterclockwise to the desired angle. Usually, the angle at which toe-in is measured is different from the angle at which caster is measured. The present wheel alignment rack allows the proper angular setting of either turntable to be reached quickly and easily, in addition to its elimination of the great physical exertion assocated with prior art methods of adjusting wheel alignment.

I claim:

1. Apparatus for use in aligning the wheels of an automobile, the apparatus including a pair of laterally spaced apart, elongated support members extending in a parallel relation to form a rack for supporting an automobile, a separate turntable disposed on each support member and adapted to rotate about an axis, the two turntables being positioned with relation to each other so they provide rotational support for the wheels of the automobile, and means for rotating at lease one of the turntables about its axis, the rotating means including power means movable in a forward and reverse direction, and an elongated actuating arm engaged with the turntable and operative in response to movement of the power means to reciprocate in a path spaced from the axis of rotation of the turntable to rotate the turntable about its axis in either a forward or reverse direction to turn the wheels of the automobile to a selected orientation in preparation for measuring and adjusting the alignment of the wheels.

2. Apparatus according to claim 1 including means for adjusting the spacing between the actuating arm and the turntable axis of rotation.

3. Apparatus according to claim 1 in which the actuating arm includes a piston arm slidably disposed in a cylinder and operative for moving in a forward direction and a reverse direction, and means rigidly engaging the piston arm with the turntable so that reciprocating movement of the piston arm rotates the turntable about its axis.

4. Apparatus according to claim 3 including a rotation arm keyed to the turntable and rotatable about the axis of the turntable, and in which the engaging means includes a lever arm rigidly secured to the piston arm and extending to the rotational axis of the turntable for engagement with the rotation arm so that forward and reverse reciprocating movement of the piston arm will swing the lever arm through an arc and will thereby turn the rotation arm to rotate the turntable through said arc.

5. Apparatus according to claim 3 including first forward and reverse actuating means adjacent one turntable and coupled with the cylinder for moving the piston arm in forward and reverse directions, and second forward and reverse actuating means adjacent the other turntable and coupled with the cylinder for moving the piston in forward and reverse directions.

6. Apparatus according to claim 5 including indicating means on each turntable for measuring the rotational arc of the turntable.

7. Apparatus according to claim 5 in which the second actuating means adjacent said other turntable includes means for cross-linking it to the first actuating means.

8. Apparatus according to claim 1 including indicating means on the turntable for measuring the rotational arc of the turntable.

9. Apparatus according to claim 5 including means for moving each turntable longitudinally relative to its corresponding support member, means for allowing the rotation arm of the turntable to move longitudinally with the turntable, and means for movably mounting the cylinder adjacent to its corresponding turntable to provide compensating movement of the cylinder in response to longitudinal movement of the rotation arm.

10. Apparatus according to claim 6 including means for moving each turntable longitudinally relative to its corresponding support member, means for allowing the rotation arm of the turntable to move longitudinally with the turntable, and means for movably mounting the cylinder adjacent to its corresponding turntable to provide compensating movement of the cylinder in response to longitudinal movement of the rotation arm.

* * * * *